(12) United States Patent
DeKeyser et al.

(10) Patent No.: US 12,406,283 B2
(45) Date of Patent: Sep. 2, 2025

(54) SYSTEMS AND METHODS TO PRESENT IN-VEHICLE CONTENT BASED ON CHARACTERIZATION OF PRODUCTS

(71) Applicant: Disney Enterprises, Inc., Burbank, CA (US)

(72) Inventors: Thomas M. DeKeyser, Burbank, CA (US); Alif Khalfan, Burbank, CA (US); David Feder, Burbank, CA (US); Patricia Chao, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/189,830

(22) Filed: Nov. 13, 2018

(65) Prior Publication Data

US 2020/0151768 A1 May 14, 2020

(51) Int. Cl.
*G06Q 30/02* (2023.01)
*B60K 35/00* (2006.01)
*G06Q 30/0251* (2023.01)
*G06V 10/46* (2022.01)
*G06V 20/20* (2022.01)
(Continued)

(52) U.S. Cl.
CPC ......... *G06Q 30/0265* (2013.01); *B60K 35/00* (2013.01); *G06Q 30/0269* (2013.01); *G06V 10/462* (2022.01); *G06V 20/20* (2022.01); *G06V 20/59* (2022.01); *G06V 20/593* (2022.01); *G06V 40/10* (2022.01); *G06V 40/172* (2022.01); *B60K 35/20* (2024.01)

(58) Field of Classification Search
CPC ...................................................... G06Q 30/02
USPC ....................................................... 705/14.02
See application file for complete search history.

(56) References Cited

U.S. PATENT DOCUMENTS 1,004,331 A 9/1911 Wright
1,004,624 A 10/1911 Brann
(Continued)

FOREIGN PATENT DOCUMENTS

CN 113193965 B 10/2021
IN 1381KOL2007 4/2009
(Continued)

OTHER PUBLICATIONS

"Battle Circuit", Capcom, available at «https://web.archive.org/web/20000111 073021 /http://www.capcom.co.jp/newproducts/arcade/battle/bs-top. html» (Orig in al Japanese web page followed by English translation), 4 pages.

(Continued)

*Primary Examiner* — Afaf Osman Bilal Ahmed
(74) *Attorney, Agent, or Firm* — Esplin & Associates, PC

(57) ABSTRACT

This disclosure relates to a system configured to present in-vehicle content based on characterization of products. The system may be coupled to a vehicle. The system may include one or more physical processors. The processor(s) may obtain user information specifying individual sets of products interacted with by individual users prior to a ride in the vehicle. The processor(s) may identify in-vehicle content specific to individual subsets of products having one or more values of one or more product attributes in common. The processor(s) may control one or more vehicle components coupled to the vehicle to provide the in-vehicle content.

20 Claims, 3 Drawing Sheets

(51) Int. Cl.
    *G06V 20/59*   (2022.01)
    *G06V 40/10*   (2022.01)
    *G06V 40/16*   (2022.01)
    *B60K 35/20*   (2024.01)

(56) References Cited

U.S. PATENT DOCUMENTS

| | | |
|---|---|---|
| 5,299,291 A | 3/1994 | Ruetz |
| 5,766,077 A | 6/1998 | Hongo |
| 6,007,338 A | 12/1999 | DiNunzio |
| 6,053,815 A | 4/2000 | Hara |
| 6,200,138 B1 | 3/2001 | Ando |
| 6,691,032 B1 | 2/2004 | Irish |
| 7,081,033 B1 | 7/2006 | Mawle |
| 7,266,847 B2 | 9/2007 | Pauker |
| 7,739,371 B2 | 6/2010 | Ikegaya |
| 7,837,544 B2 | 11/2010 | Tipping |
| 8,078,163 B2 | 12/2011 | Lemond |
| 8,190,295 B1 | 5/2012 | Garretson |
| 8,758,126 B2 | 6/2014 | Bavitz |
| 8,762,227 B1* | 6/2014 | Fox .................. G06Q 30/0255 |
| | | 705/26.7 |
| 8,831,228 B1 | 9/2014 | Agrawal |
| 8,882,595 B2 | 11/2014 | Chowdhary |
| 8,894,462 B2 | 11/2014 | Leyland |
| 8,941,690 B2 | 1/2015 | Seder |
| 8,948,541 B2 | 2/2015 | Neville |
| 8,988,465 B2 | 3/2015 | Baron |
| 9,007,400 B2 | 4/2015 | Takahashi |
| 9,008,310 B2 | 4/2015 | Nelson |
| 9,266,018 B2 | 2/2016 | Story |
| 9,293,042 B1 | 3/2016 | Wasserman |
| 9,327,189 B2 | 5/2016 | Bavitz |
| 9,361,730 B2 | 6/2016 | Keating |
| 9,467,515 B1* | 10/2016 | Penilla ................ H04L 67/306 |
| 9,610,510 B2 | 4/2017 | Comploi |
| 9,643,086 B2 | 5/2017 | Tipping |
| 9,669,302 B2 | 6/2017 | Park |
| 9,674,361 B2 | 6/2017 | Ristock |
| 9,715,764 B2 | 7/2017 | Alaniz |
| 9,744,448 B2 | 8/2017 | Mullen |
| 9,814,991 B2 | 11/2017 | Van Winkle |
| 9,818,228 B2 | 11/2017 | Lanier |
| 9,821,920 B2 | 11/2017 | Cole |
| 9,922,466 B2 | 3/2018 | Donnelly |
| 10,019,070 B2 | 7/2018 | Szczerba |
| 10,025,431 B2 | 7/2018 | Li |
| 10,043,316 B2 | 8/2018 | Donnelly |
| 10,043,999 B2* | 8/2018 | Senoo ................ H10K 59/8731 |
| 10,045,147 B2 | 8/2018 | Dickow |
| 10,046,241 B1 | 8/2018 | Krosky |
| 10,059,347 B2 | 8/2018 | Thieberger-Navon |
| 10,123,155 B2 | 11/2018 | Grover |
| 10,140,464 B2 | 11/2018 | Lebeck |
| 10,162,998 B2 | 12/2018 | Park |
| 10,186,065 B2 | 1/2019 | Anderson |
| 10,310,600 B2 | 6/2019 | Hong |
| 10,339,711 B2 | 7/2019 | Ng-Thow-Hing |
| 10,366,290 B2 | 7/2019 | Wang |
| 10,376,776 B2 | 8/2019 | Lowe |
| 10,423,999 B1* | 9/2019 | Doctor ................ G06Q 30/0631 |
| 10,482,669 B2 | 11/2019 | Rober |
| 10,501,053 B2 | 12/2019 | Tokunaga |
| 10,506,092 B1 | 12/2019 | Stephenson |
| 10,572,123 B2 | 2/2020 | Penilla |
| 10,585,471 B2 | 3/2020 | Reichow |
| 10,589,625 B1 | 3/2020 | Goslin |
| 10,639,557 B2 | 5/2020 | Hake |
| 10,969,748 B1 | 4/2021 | Goslin |
| 10,970,560 B2 | 4/2021 | Khalfan |
| 11,228,436 B1 | 1/2022 | Foley |
| 11,251,978 B2 | 2/2022 | Ingraham |
| 11,369,878 B1 | 6/2022 | Koch |
| 11,605,062 B2 | 3/2023 | Prakash |
| 2001/0025287 A1 | 9/2001 | Okabe |
| 2003/0027636 A1 | 2/2003 | Covannon |
| 2003/0104824 A1 | 6/2003 | Hale |
| 2003/0130031 A1 | 7/2003 | Yoshida |
| 2004/0059922 A1 | 3/2004 | Harris |
| 2005/0021192 A1 | 1/2005 | Takafuji |
| 2005/0059483 A1 | 3/2005 | Borge |
| 2005/0144091 A1 | 6/2005 | Harper |
| 2006/0052153 A1 | 3/2006 | Vlazny |
| 2006/0143270 A1 | 6/2006 | Wodtke |
| 2006/0224456 A1 | 10/2006 | Walker |
| 2006/0277100 A1 | 12/2006 | Parham |
| 2007/0060233 A1 | 3/2007 | Liccardo |
| 2007/0087834 A1 | 4/2007 | Moser |
| 2007/0093299 A1 | 4/2007 | Bergeron |
| 2007/0139671 A1 | 6/2007 | Stevens |
| 2007/0197275 A1 | 8/2007 | Gagner |
| 2007/0206023 A1 | 9/2007 | Street |
| 2008/0091782 A1 | 4/2008 | Jakobson |
| 2008/0105751 A1 | 5/2008 | Landau |
| 2008/0148067 A1 | 6/2008 | Sitrick |
| 2008/0200244 A1 | 8/2008 | Rowe |
| 2008/0309010 A1 | 12/2008 | Bowling |
| 2008/0311983 A1 | 12/2008 | Koempel |
| 2009/0069084 A1 | 3/2009 | Reece |
| 2009/0079705 A1 | 3/2009 | Sizelove |
| 2009/0137323 A1 | 5/2009 | Fiegener |
| 2009/0176566 A1 | 7/2009 | Kelly |
| 2009/0313358 A1 | 12/2009 | Shepherd |
| 2010/0033427 A1 | 2/2010 | Marks |
| 2010/0093421 A1 | 4/2010 | Nyman |
| 2010/0098092 A1 | 4/2010 | Luo |
| 2010/0130296 A1 | 5/2010 | Ackley |
| 2010/0182340 A1 | 7/2010 | Bachelder |
| 2010/0268661 A1* | 10/2010 | Levy .................. G06Q 30/02 |
| | | 705/347 |
| 2010/0324984 A1 | 12/2010 | Pelto |
| 2010/0331721 A1 | 12/2010 | Epley |
| 2011/0098092 A1 | 4/2011 | Reiche, III |
| 2011/0183754 A1 | 7/2011 | Alghamdi |
| 2011/0216948 A1 | 9/2011 | Yalla |
| 2012/0089275 A1 | 4/2012 | Yao-Chang |
| 2012/0142415 A1 | 6/2012 | Lindsay |
| 2012/0256945 A1 | 10/2012 | Kidron |
| 2012/0264518 A1 | 10/2012 | Rouille |
| 2012/0289122 A1 | 11/2012 | Elliott |
| 2012/0295703 A1 | 11/2012 | Reiche |
| 2012/0295704 A1 | 11/2012 | Reiche |
| 2013/0030645 A1 | 1/2013 | Divine |
| 2013/0083003 A1 | 4/2013 | Perez |
| 2013/0083061 A1 | 4/2013 | Mishra |
| 2013/0157607 A1 | 6/2013 | Paek |
| 2013/0166147 A1 | 6/2013 | Chudzinski |
| 2013/0274024 A1 | 10/2013 | Geylik |
| 2013/0296058 A1 | 11/2013 | Leyland |
| 2014/0067208 A1 | 3/2014 | Klappert |
| 2014/0100020 A1 | 4/2014 | Carroll |
| 2014/0100029 A1 | 4/2014 | Reiche |
| 2014/0128144 A1 | 5/2014 | Bavitz |
| 2014/0128145 A1 | 5/2014 | Hwang |
| 2014/0129640 A1 | 5/2014 | Ogawa |
| 2014/0162785 A1 | 6/2014 | Reiche |
| 2014/0163771 A1 | 6/2014 | Demeniuk |
| 2014/0189017 A1 | 7/2014 | Prakash |
| 2014/0201004 A1* | 7/2014 | Parundekar ........ G06Q 30/0271 |
| | | 705/14.62 |
| 2014/0274313 A1 | 9/2014 | Bala |
| 2014/0295963 A1 | 10/2014 | Ishikawa |
| 2014/0309919 A1* | 10/2014 | Ricci .................. B60K 35/00 |
| | | 701/301 |
| 2014/0342790 A1 | 11/2014 | Kim |
| 2015/0003609 A1 | 1/2015 | Nelson |
| 2015/0024852 A1 | 1/2015 | Pacey |
| 2015/0065237 A1 | 3/2015 | Hohn |
| 2015/0080125 A1 | 3/2015 | Andre |
| 2015/0097860 A1 | 4/2015 | Alaniz |
| 2015/0097864 A1 | 4/2015 | Alaniz |
| 2015/0100179 A1 | 4/2015 | Alaniz |
| 2015/0134371 A1 | 5/2015 | Shivakumar |
| 2015/0145671 A1 | 5/2015 | Cohen |

(56) References Cited

U.S. PATENT DOCUMENTS

| | | | |
|---|---|---|---|
| 2015/0174479 A1 | 6/2015 | Reiche | |
| 2015/0202962 A1 | 7/2015 | Habashima | |
| 2015/0269780 A1 | 9/2015 | Herman | |
| 2015/0294505 A1 | 10/2015 | Atsmon | |
| 2015/0339910 A1* | 11/2015 | Stenzler | G01S 17/06 |
| | | | 340/573.4 |
| 2015/0346722 A1 | 12/2015 | Herz | |
| 2015/0363092 A1 | 12/2015 | Morton | |
| 2016/0005070 A1* | 1/2016 | Burr | G06Q 30/0253 |
| | | | 705/14.51 |
| 2016/0042607 A1 | 2/2016 | Mccoy | |
| 2016/0071397 A1 | 3/2016 | Logan | |
| 2016/0096114 A1 | 4/2016 | Van Winkle | |
| 2016/0140614 A1* | 5/2016 | Brubaker | G06Q 30/02 |
| | | | 705/14.46 |
| 2016/0189444 A1 | 6/2016 | Madhok | |
| 2016/0199730 A1 | 7/2016 | Olson | |
| 2016/0206955 A1 | 7/2016 | Goslin | |
| 2016/0206957 A1 | 7/2016 | Goslin | |
| 2016/0216854 A1 | 7/2016 | Mcclellan | |
| 2016/0224939 A1 | 8/2016 | Chen | |
| 2016/0299567 A1 | 10/2016 | Crisler | |
| 2016/0310839 A1 | 10/2016 | Leyland | |
| 2016/0313792 A1 | 10/2016 | Siegel | |
| 2016/0346704 A1 | 12/2016 | Wagner | |
| 2017/0021273 A1 | 1/2017 | Rios | |
| 2017/0021282 A1 | 1/2017 | Comploi | |
| 2017/0045946 A1 | 2/2017 | Smoot | |
| 2017/0050743 A1 | 2/2017 | Cole | |
| 2017/0068311 A1 | 3/2017 | Evans | |
| 2017/0072316 A1 | 3/2017 | Finfter | |
| 2017/0078621 A1 | 3/2017 | Sahay | |
| 2017/0103571 A1 | 4/2017 | Beaurepaire | |
| 2017/0106288 A1 | 4/2017 | Reiche | |
| 2017/0132334 A1 | 5/2017 | Levinson | |
| 2017/0154024 A1 | 6/2017 | Subramanya | |
| 2017/0158023 A1 | 6/2017 | Stevanovic | |
| 2017/0166221 A1 | 6/2017 | Osterman | |
| 2017/0203205 A1 | 7/2017 | Nelson | |
| 2017/0236130 A1 | 8/2017 | Kee | |
| 2017/0236328 A1 | 8/2017 | Eatedali | |
| 2017/0253252 A1 | 9/2017 | Donnelly | |
| 2017/0270502 A1* | 9/2017 | Finbow | G06Q 30/06 |
| 2017/0300999 A1* | 10/2017 | Wilkinson | G06Q 90/00 |
| 2017/0330034 A1 | 11/2017 | Wang | |
| 2017/0344754 A1 | 11/2017 | Kumar | |
| 2017/0352185 A1 | 12/2017 | Bonilla Acevedo | |
| 2018/0008894 A1 | 1/2018 | Sack | |
| 2018/0011988 A1 | 1/2018 | Ziegler | |
| 2018/0040162 A1 | 2/2018 | Donnelly | |
| 2018/0040163 A1 | 2/2018 | Donnelly | |
| 2018/0043272 A1 | 2/2018 | Van Winkle | |
| 2018/0089900 A1 | 3/2018 | Rober | |
| 2018/0089901 A1 | 3/2018 | Rober | |
| 2018/0096501 A1 | 4/2018 | Anderson | |
| 2018/0181412 A1* | 6/2018 | Paratey | G06F 9/4451 |
| 2018/0231973 A1 | 8/2018 | Mattingly | |
| 2018/0247352 A1 | 8/2018 | Rogers | |
| 2018/0247364 A1* | 8/2018 | Nakadai | G06Q 30/02 |
| 2018/0342001 A1 | 11/2018 | Chavarria | |
| 2018/0369702 A1 | 12/2018 | Hake | |
| 2019/0001987 A1 | 1/2019 | Kim | |
| 2019/0014070 A1 | 1/2019 | Mertvetsov | |
| 2019/0047498 A1 | 2/2019 | Alcaidinho | |
| 2019/0065970 A1 | 2/2019 | Bonutti | |
| 2019/0075437 A1 | 3/2019 | Shaikh | |
| 2019/0101976 A1 | 4/2019 | Reichow | |
| 2019/0157607 A1 | 5/2019 | Kim | |
| 2019/0220674 A1 | 7/2019 | Khalfan | |
| 2019/0299105 A1 | 10/2019 | Knight | |
| 2019/0385213 A1* | 12/2019 | Pande | G06Q 30/0224 |
| 2020/0005284 A1 | 1/2020 | Vijayan | |
| 2020/0053400 A1 | 2/2020 | Chao | |
| 2020/0074181 A1 | 3/2020 | Chang | |
| 2020/0163616 A1 | 5/2020 | Sakaya | |
| 2020/0193163 A1 | 6/2020 | Chang | |
| 2020/0376387 A1 | 12/2020 | Packin | |
| 2021/0016184 A1 | 1/2021 | Kalama | |
| 2021/0056762 A1 | 2/2021 | Robbe | |
| 2021/0217026 A1 | 7/2021 | Hassani | |
| 2021/0256070 A1 | 8/2021 | Bao | |
| 2021/0284088 A1 | 9/2021 | Yamaguchi | |
| 2021/0287195 A1 | 9/2021 | Prakash | |
| 2022/0004600 A1 | 1/2022 | Bangole | |
| 2022/0069996 A1 | 3/2022 | Xue | |
| 2022/0148268 A1 | 5/2022 | Yilanci | |
| 2022/0248072 A1 | 8/2022 | Gupta | |
| 2022/0258059 A1 | 8/2022 | Murcin | |
| 2022/0266148 A1 | 8/2022 | Koch | |
| 2023/0142101 A1 | 5/2023 | Hirasawa | |
| 2024/0152909 A1 | 5/2024 | Khalfan | |

FOREIGN PATENT DOCUMENTS

| | | |
|---|---|---|
| JP | 2019065430 | 4/2019 |
| WO | 2007101785 A1 | 9/2007 |
| WO | 2018128946 A1 | 7/2018 |

OTHER PUBLICATIONS

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hac king [retrieved on Nov. 12, 2014] (8 pgs).

"Video Game/ Battle Circuit", TV Tropes, available at «https://web.archive.org/web/20150114005112/http://tvtropes.org/pmwiki/pmwiki .php/VideoGameBattleCircuit» (4 pages).

Dagamant, 'Skylanders Hacking', Retrieved from the Internet http://web.archive.ora/web/20120309212642/http://www,suncries.com/skvlaners-hack ing Feb. 27, 2012, XP055152538, 8 pages.

Extended European Search Report issued in European Patent Application No. 14175300.4, dated Nov. 19, 2014. (6 pgs).

Kloster, Benjamin, 'Wanted: Encryption Scheme for Copy Protection Purposes', Retrieved from the Internet http://stackoverflow.com/questions/14529732/wanted-encryption-scheme-for-copy-protection-purposes, Jan. 25, 2013, XP055152568, 2 pages.

Adam Hartley, 5 Predictions for the Future of in-Car Entertainment, Apr. 9, 2019 [https://360.here.com/5-predictions-for-the-future-of-in-car-leisure-entertainment], (5 pages).

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

Google search "Iphone Figurine" (Year: 2020), 1 page.

NPX "Software-Apple-Carplay: Software Technology for CarPlay", https://www.nxp.com/design/software/embedded-software/software-technology-for-carplay:Software-Apple-Carplay (Year: 2020), 3 pages.

https://maiarlaunchpad.com/holoride_Litepaper_V2.1_Nov21.pdf, pp. 1-26.

https://www.ibm.com/downloads/cas/M8AOGADZ, 2018, pp. 1-8.

Holoride, "Adding Thrill to Every Ride" Conceptual Litepaper V.2.1; https://maiarlaunchpad.com/holoride_Litepaper_V2.1_Nov21. pdf ; Nov. 2021 (26 pages).

IBM Institute for Business Value, "Blockchain for mobility services" https://www.ibm.com/downloads/cas/M8AOGADZ ; Jan. 2018 (8 pages).

"Dubai parks, etisalat to create an integrated smart theme park"; Gulf News; Jan. 13, 2016 (2 pages).

"Dynamic NFTs for each player in the 2022 NBA Playoffs"; The Association NFT; https://theassociationnft.com/#/ ; 2022 (5 pages).

"The Aeternals: New NFT and Interactive Technology"; Business Wire; Mar. 2, 2022 (3 pages).

"What is a dynamic NFT"; Chainlink; https://blog.chain.link/what-is-a-dynamic-nft/ ; Apr. 7, 2022 (10 pages).

(56) References Cited

OTHER PUBLICATIONS

Adelyn Zhou; "The Next Wave of NFTs will be Dynamic"; Nasdaq; Mar. 29, 2021 (8 pages).
Charlotte Coates; "NFTs: the next big thing for the attractions industry"; Sep. 21, 2021 (14 pages).
Cory Himel; "Developers can use gamification"; Gigster, Mar. 16, 2022 (5 pages).
Lucas Caciolo; "Decentralized theme parks promise kids virtual prizes to earn as they learn"; forkast; Jun. 29, 2021 (4 pages).
Apple (Developing Wireless CarPlay System, https://developer.apple.com/videos/play/wwdc2017/717/WWDC 2017, video and slide). (Year: 2017).
Manzoor et al, "Scavenger Hunt: Utilization of Blockchain and IoT for a Location-Based Game," 2020, IEEE. Retrieved from <https://ieeexplore.ieee.org/stamp/stamp.jsp?tp=&arnumber=9253568&tag=1>c on Oct. 18, 2024. (Year: 2020).
Dobbins et al. "Creating Human Digital Memories for a Richer Recall of Life Experiences" 2013 10th IEEE Internaional Conference on Networking, Sensing and Control, pp. 246-251 (Year: 2013).
Olsson et al. "User-Centered Design of a Mobile Application for Sharing Life Memories," Proceedings of the 4th international conference on mobile technology, applications, and systems and the 1st international symposium on Computer human interaction in mobile technology—Mobility '07, pp. 524-531, (Year: 2007).

\* cited by examiner

SYSTEMS AND METHODS TO PRESENT IN-VEHICLE CONTENT BASED ON CHARACTERIZATION OF PRODUCTS

FIELD

This disclosure relates to systems and methods to present in-vehicle content based on characterization of products.

BACKGROUND

Vehicles may include advanced systems for one or more of navigation, climate control, entertainment, and/or other features and/or functionality. For example, navigation systems may prompt a driver of required maneuvers utilizing advanced maps as well as voice-based interactions. Entertainment systems, including audio and visual systems, are a staple in most vehicles and can be found through a vehicle. For example, a video screen may be mounted to the backs of headrests and/or on purpose built entertainment systems.

SUMMARY

This disclosure relates to systems and methods to present content in vehicles ("in-vehicle content") based on characterization of products interacted with by users prior to individual rides in the vehicles. Individual users may interact with individual sets of products offered within a network of products. The presented in-vehicle content for an individual user may be specific to an individual subset of products interacted with by the individual uses. The individual subset of products may include one or more products which share one or more values of one or more product attributes in common. By way of non-limiting illustration, a product attribute may include product brand. The presented in-vehicle content, for example, may be specific to a subset of products within a set of products interacted with by a user which share a common brand. The in-vehicle content may be presented using one or more vehicle components of a vehicle. The one or more vehicle components may include one or more of a display, an audio output device, a climate control system, and/or other components of the vehicle.

Vehicle technology is becoming more and more hands-off. Voice-based guidance is likely becoming the predominant form of communication with vehicles. One or more implementations of the systems and methods presented herein may bring value to this medium by providing rich entertainment with passengers by automatically detecting the presence of users and providing content related to products which they have previously interacted with.

One or more implementations of the systems presented herein may be at least partially coupled to, or included in, a vehicle. The vehicle may include a passenger vehicle and/or other vehicle configured to transport people. The passenger vehicle may be self-propelled (e.g., a sedan, a truck, a bus, and/or other vehicles), attached to an engine (e.g., a train, trolley, tug or similar vehicle), and/or may be coasting or ballistic (e.g., an orbiting, falling, or coasting vehicle).

A system configured to present in-vehicle content based on characterization of products may include one or more of a vehicle, one or more vehicle components, one or more physical processors, and/or other components. The one or more vehicle components may include one or more of one or more vehicle sensors, one or more docks, one or more displays, one or more audio output devices, and/or other components. The one or more displays and/or one or more audio output devices may include at least part of a navigation system and/or entertainment system of the vehicle.

In some implementations, the one or more processors may be configured by machine-readable instructions. The machine-readable instructions may include one or more computer program components. The computer program components may include one or more of a detection component, a user component, a characterization component, a content component, a control component, and/or other components.

The detection component may be configured to obtain output signals conveying detection information and/or other information. The detection information may facilitate detection and/or identification of users near and/or within an interior of the vehicle. The detection and/or identification of users near and/or within an interior of the vehicle may be based on detection and/or identification of products in the form of physical object held by the users near and/or within the interior of the vehicle.

The user component may be configured to obtain user information for individual users. The user information for the individual users may specify individual sets of products interacted with by the individual users prior to a ride in the vehicle. By way of non-limiting illustration, first user information for a first user and/or other user information for other users may be obtained. The first user information may specify a first set of products interacted with by the first user prior to the ride in the vehicle.

The characterization component may be configured to characterize individual products based on one or more product attributes. The characterization component may be configured to identify individual subsets of products including products that share one or more values of one or more product attributes in common. By way of non-limiting illustration, the characterization component may be configured to identify a first subset of products included in the first set of products. The first subset of products may include one or more products within the first set of products having a first value of a first product attribute in common.

The content component may be configured to identify in-vehicle content for presentation. The in-vehicle content for presentation may include content specific to individual subsets of products within the individual sets of products interacted with by individual users. In some implementations, the content component may identify in-vehicle content for presentation that may be specific to an individual subset of products that includes one or more products detected (and identified) as being near and/or within the vehicle. In some implementations, the content component may identify in-vehicle content for presentation that may be specific to an individual subset of products that includes relatively more products than other subsets of products. An individual subset of products that includes relatively more products than other subsets of products within a set of products interacted with by a user may indicate that the user has an affinity to products having the one or more values of one or more products attributes common within that individual subset that includes the relatively most products. By way of non-limiting illustration, a first set of content specific to the first subset of products included in the first set of products may be identified.

The control component may be configured to control one or more vehicle components coupled to the vehicle to provide the in-vehicle content specific to the individual subsets of products. By way of non-limiting illustration, a first vehicle component and/or other vehicle components of the vehicle may be controlled to provide the first set of content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. The drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
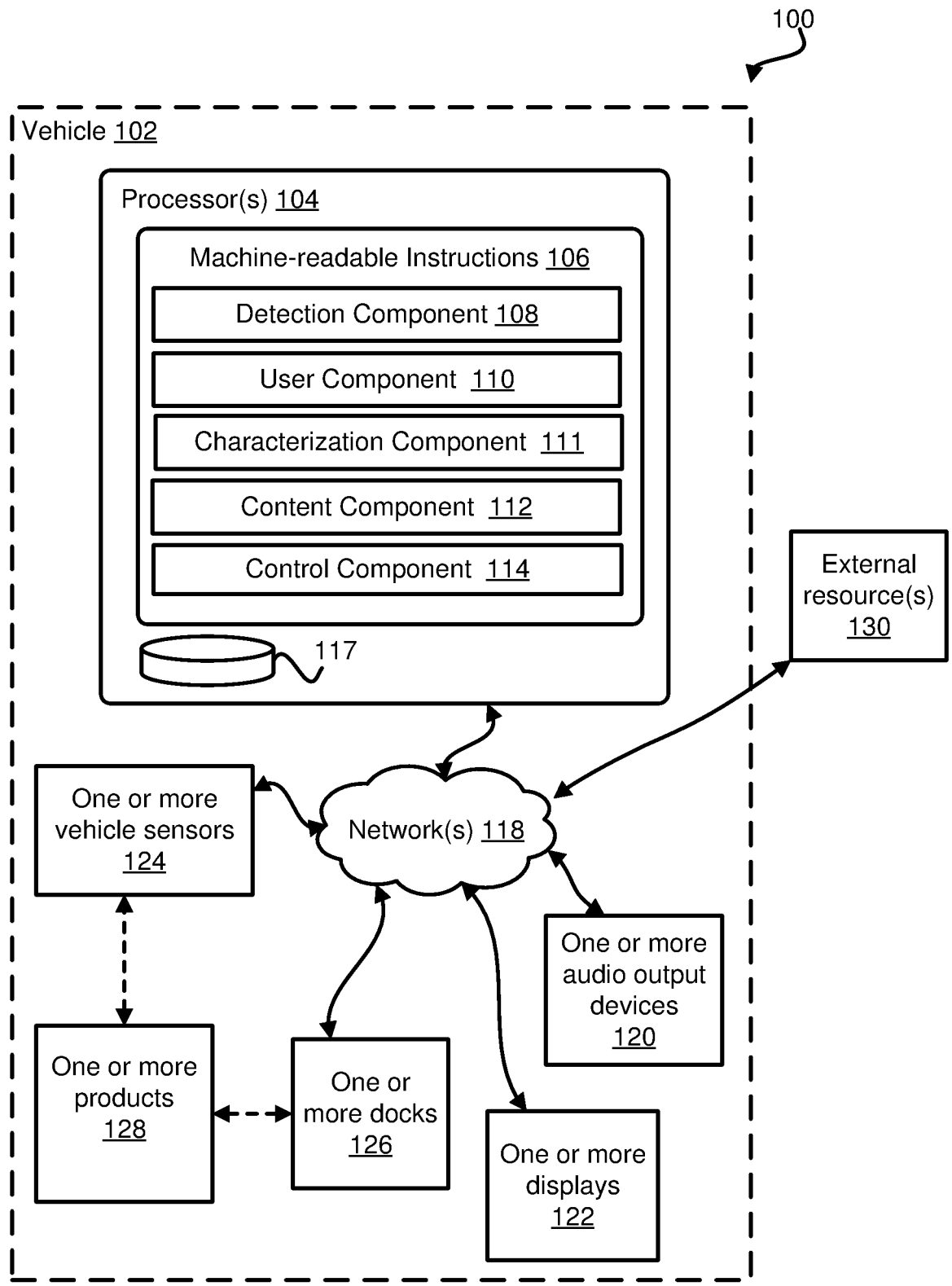
FIG. 1 illustrates a system configured to present in-vehicle content based on characterization of products, in accordance with one or more implementations.

FIG. 1 illustrates a system 100 configured to present in-vehicle content based on characterization of products, in accordance with one or more implementations. The system 100 may be at least partially coupled to, or included in, a vehicle 102. The vehicle 102 may include a passenger vehicle and/or other vehicles. The vehicle 102 may be self-propelled (e.g., a sedan, a truck, a bus, and/or other vehicles), attached to an engine (e.g., a train, trolley, tug or similar vehicle), and/or may be coasting or ballistic (e.g., an orbiting, falling or coasting vehicle).

One or more implementations of system 100 may be configured to bring entertainment to vehicle 102 by providing content to users based on an automatic detection and/or identification of users near and/or within the vehicle. The content may be specific to subsets of products interacted with by individual users. An individual product may include a good and/or a service. An individual good may include a physical object. An individual good may include one or more of a toy, a game console, a book, an article of clothing, and/or other physical object. An individual service may include an experience of a user which may or may not require interaction with one or more products. An individual service may include one or more of an online video game, an attraction at a theme park, a movie viewing experience, and/or other service.

The system 100 may include one or more of one or more physical processors 104, one or more vehicle components, one or more docks 126, one or more products 128, external resource(s) 130, and/or other components. The one or more vehicle components may include one or more of one or more audio output devices 120, one or more displays 122, one or more vehicle sensors 124, and/or other components. Some or all components of system 100 may be installed in vehicle 102 and/or otherwise coupled with vehicle 102. The one or more audio output devices 120, one or more displays 122, and/or other vehicle components may be included as part of one or both of a vehicle entertainment system and/or a vehicle navigation system. A vehicle entertainment system and/or a vehicle navigation system may be disposed within a console of vehicle 102 and/or other locations within vehicle. In some implementations, an individual display and/or an individual audio output device may be incorporated into one or more of a headrest, a ceiling, an arm rest, and/or other location within vehicle 102. An individual audio output device may comprise, for example, a speaker.

In some implementations, one or more vehicle components of vehicle 102 may further and/or alternatively include one or more of a climate control system, lighting system, and/or other components. The climate control system may include one or more of an air conditioner, a header, a fan, a seat heater, a seat fan, and/or other components. A lighting system may include one or more of an overhead light (e.g., a cabin light), an interior under-glow light, an exterior underbody light, and/or other lights.

The one or more vehicle sensors 124 and/or one or more docks 126 may provide interfaces for individual ones of one or more products 128 to interact with one or more physical processor 104 and/or other components of system 100. By way of non-limiting illustration, one or more vehicle sensors 124 and/or one or more docks 126 may be configured to generate output signals conveying detection information and/or other information. The detection information may facilitate presence detection and/or identification of products (e.g., physical objects) and/or users near and/or within an interior of vehicle 102.

The one or more vehicle sensors 124 may be installed in vehicle 102 and/or may be otherwise coupled with vehicle 102. The one or more vehicle sensors 124 may include one or more of image sensors (e.g., monocular and/or stereo cameras), temperature sensors, vehicle speed sensors, wheel speed sensors, motion sensors (e.g., detect and/or recognize motion in and/or outside the vehicle), accelerometers, tilt sensors, inclination sensors, angular rate sensors, gyroscopes, navigation sensors, geolocation sensors, magnetometers, radar detectors, radar sensors, proximity sensors, range sensors (e.g., lidar and/or other range sensors), vibration sensors, light detection sensors, engine control module sensors, biometric sensors, Advanced Driver Assistance Systems (ADAS), External sensors on traffic controlled intersections (cameras, etc.), audio sensors (e.g. to detect sound outside and/or inside vehicle), weather sensors, light sensors, and/or other sensors.

The one or more vehicle sensors 124 may be configured to generate output signals conveying ride information. In some implementations, ride information may be determined from other sources (e.g., external resource(s) 130).

In some implementations, ride information may include one or more of motion information, activity information, trip progress information, environment information, caravanning information, and/or other information characterizing one or more of movement, operation, and/or context of the vehicle.

Motion information may characterize movement of a vehicle and/or other aspects of the vehicle. Movement may be characterized at a given time, over a duration of time, at a location, and/or over a distance. Motion information may include one or more information describing whether the vehicle is moving forward, moving backwards, moving right, moving left, moving up, moving down, accelerating in a direction and/or angle, decelerating in a direction and/or angle, and/or other aspects of vehicle movement. In some implementations, one or more vehicle sensors 124 that may generate output signals conveying motion information may include one or more of a vehicle speed sensor, a wheel speed sensor, a motion sensor, an accelerometer, a tilt sensor, an inclination sensor, an angular rate sensor, a gyroscope, a magnetometer, a vibration sensor, an engine control module sensor, and/or other sensors.

Activity information may characterize operation of a vehicle and/or other aspects of the vehicle. For example, activity information may characterize actions performed by an operator of a vehicle. Activity information may describe a quantity and/or quality of an action performed by the operator and/or other information. For example, a quality of an action may include a definition of the action. A quantity of an action may include a value specifying a number of occurrences of the action. In some implementations, an action of an operator may include one or more of head movement, tightening and/or loosening of a grip on a steering wheel, motion of legs and/or feet, and/or other actions. In some implementations, one or more vehicle sensors 124 that may generate output signals conveying activity information may include one or more of an image sensor that characterizes a visual appearance of a person in the vehicle (e.g., generates information defining images and/or video of the operator), a sound sensor that characterizes a sound made by the operator, a biometric sensor coupled to the operator, and/or other sensors. By way of non-limiting illustration, images and/or video showing head movement of the operator may indicate a direction of turn and/or anticipated turn of the vehicle by the operator. By way of non-limiting illustration, tightening of a grip and/or increase in a heartrate may be indicative of an abrupt and/or evasive maneuver being performed and/or anticipated to be performed.

Trip progress information may characterize movement and/or context of a vehicle. For example, trip progress information may characterize a current trip taken by the vehicle. The trip may be characterized by one or more of a location of the vehicle along a trip, a distance traveled in a trip, a distance remaining in a trip, a duration traveled in a trip, and/or a remaining expected duration of a trip. Trip progress information may include information regarding a status of a trip, including specification of one or more of a location of a vehicle, a traveled distance, a remaining distance, a traveled duration, an expected remaining duration, and/or other trip progress information. In some implementations, one or more vehicle sensors 124 that may generate output signals conveying trip progress information may include one or more of a navigation sensor, a geolocation sensor, a magnetometer, a vehicle sensor, an engine control module sensor, and/or other sensors.

Environment information may characterize a context of a vehicle. The context of the vehicle may include a condition of an environment around a vehicle at a time, over a duration of time, at a location, and/or over a distance. The condition of an environment around a vehicle may include one or more of time, weather, temperature, humidity, lighting, terrain, nearby objects, state of nearby objects, nearby buildings, state of nearby buildings, and/or other environment information. In some implementations, terrain may include road terrain (e.g., speed bumps, dips, curves, and/or other terrain), environment terrain (e.g., desert, urban, rural, mountainous, etc.), and/or other features. Nearby objects may include one or more of people, animals, traffic lights, stop signs, and/or other objects. State of the nearby objects may describe the objects at a time, over a duration of time, at a location, and/or over a distance. By way of non-limiting illustration, a state of a traffic light may include a current color of the traffic light, the next color of the traffic light, the time it may take to change color, and/or other information. A state of a person may describe whether the person is standing, walking, running, waving, and/or other information. State of a nearby building may describe the building at a time, over a duration of time, at a location, and/or over a distance. By way of non-limiting illustration, a state of a nearby building may describe its current distance from a vehicle, an orientation of the building relative the vehicle, whether the building is under construction, and/or other information.

In some implementations, one or more vehicle sensors 124 that may generate output signals conveying environment information may include one or more of a clock, an image sensor, a temperature sensor, a vibration sensor, a light detection sensor, an engine control module sensor, a ranging sensor, a GPS, a navigation system, and/or other sensors. In some implementations, environment information may be obtained one or more external resources 130. By way of non-limiting illustration, the one or more external resources 130 may include a source providing a map of an environment including locations of buildings and objects (e.g., Google® Maps), and/or other sources.

Caravanning information may characterize a context of a vehicle. For example, context of the vehicle may refer to one or more other vehicles at or near a vehicle. By way of non-limiting illustration, an other vehicle may be characterized by one or more of a relative position of the other vehicle relative to the vehicle at a time, over a duration of time, at a location, and/or over a distance. Caravanning information may include information regarding a position, an orientation, and/or speed of the vehicle and/or the other vehicle. In some implementations, one or more vehicle sensors 124 that may generate output signals conveying caravanning information may include one or more of an image sensor, a vehicle speed sensor, a wheel speed sensor, a motion sensor, an accelerometer, a tilt sensor, an inclination sensor, an angular rate sensor, a gyroscope, a navigation sensor, a geolocation sensor, a magnetometer, a radar detector, a radar sensor, a proximity sensor, a ranging sensor, a vehicle sensor, an engine control module sensor, and/or other sensors.

In some implementations, caravanning information and/or other information may be obtained one or more external resources 130. By way of non-limiting illustration, the one or more external resources 130 may include other vehicles including sensors the same as or similar to one or more vehicle sensors 124. Such a configuration may facilitate a multi-vehicle shared experience. For example, multiple vehicles may implement system 100. The vehicles may exchange information. The multiple vehicles may be presented the same experience such that users of one vehicle may experience the same content as users in another vehicle. In some implementations, interactions of one vehicle may be reflected in the content presented to another vehicle.

The image sensor may generate output signals conveying the detection information in the form of image information. The image information may define visual content in the form of one or more images. Images may be defined by pixels and/or other information. Pixels may be characterized by one or more of pixel location, pixel color, pixel transparency, and/or other information. The image information may facilitate detection and/or identification of products and/or users near and/or within an interior and/or exterior of vehicle 102 by virtue of the visual content defined by the image information including depictions of the one or more products and/or users. One or more image-based object detection and/or identification techniques may be utilized to detect presence of products and/or users within images and/or identify those products and/or users within the images. By way of non-limiting illustration, techniques may include one or more of computer vision, Speeded Up Robust Features (SURF), Scale-invariant Feature Transform (SIFT), Oriented FAST and rotated BRIEF (ORB), Optical Character Recognition (OCR), facial recognition, and/or other techniques.

An audio sensor may generate output signals conveying the detection information in the form of audio information. The audio information may define voice and/or sounds captured by the audio sensor. An audio sensor may include a separate device and/or may be part of another device. For example, an audio sensor may include a microphone. The microphone may be coupled to the vehicle 102. The audio information may facilitate detection and/or identification of products and/or users near and/or within an interior of vehicle 102 by virtue of the voice and/or sounds captured by the audio sensor including utterances that convey presence and/or identification of one or more users and/or products. By way of non-limiting illustration, a user may utter that they are carrying a particular product, e.g., by uttering the identify (e.g., name) of the product. Further, the user themselves may be identified based on voice matching the utterance to a known voice profile of the user. One or more audio recognition techniques may be utilized to detect presence of products and/or identify those products from sounds captured by the audio sensor.

In some implementations, an individual product may comprise a physical object depicting and/or having a form factor that physically embodies an appearance of an entity. The entity may be a virtual entity such as one or more of a game entity, a movie entity, and/or other entities. The entity may be a fantastical entity, such as a fictional character in a movie portrayed by a real person. Examples of form factors may include one or more of a toy figurine, a toy accessory, article of clothing, and/or other form factors. By way of non-limiting example, a product may be one or more of a toy figurine embodying an appearance of a fictional character in a movie, a toy accessory embodying an appearance of a tool or object utilized by a fictional character in a movie or video game, a t-shirt depicting the fictional character, and/or other types of products. A product may be an RFID enabled device including one or more of one or more radio frequency communication components, non-transitory electronic storage, and/or other components. The one or more radio frequency communication components may be configured to facilitate communication with one or more docks 126. The non-transitory electronic storage may be configured to store information.

In some implementations, detection of presence of a product and/or identification of the product and/or user holding the product may be facilitated by electronics embedded within or otherwise included in the product. For example, the product may include a radio-frequency identification (RFID) chip configured to emit and/or receive radio-frequency electromagnetic signals responsive to the product being disposed in a proximity of an individual dock of one or more docks 126, and/or other components. As another example, the product may include an integrated circuit configured to transfer signals associated with one or more of identification of a user of the product and/or the product itself, values of product attributes of the product, and/or other information responsive to the product being placed in contact with a portion of an individual dock and/or within a proximity of the individual dock. In some implementations, some or all of the functionality of an individual dock may be attributed to an individual sensor of one or more vehicle sensors 124, where the individual sensor may include the same or similar components as the individual dock.

In some implementations, a product may include a physical object that may be used in gameplay. By way of non-limiting illustration, a physical object may be configured to interface with gaming consoles and/or computing platforms. In some implementations, a physical object may depict a game entity (e.g., game character) in a game. In some implementations, a physical object may interface with a gaming console via a reader configured to obtain signals from the physical object, provide signals associated with physical object to the game console and/or a game server, and/or provide signals to the physical object to store information carried by those signals in the physical object.

In some implementations, a product may be a purpose-built device configured to track and/or store user activity within one or more geographic locations and/or store other information. The product may include one or more of a wristband, a tag, a card, a coin, and/or other objects. By way of non-limiting illustration, the product may be an RFID enabled device including one or more of one or more radio frequency communication components, non-transitory electronic storage, and/or other components. The non-transitory electronic storage may be configured to store one or more of user information and/or other information. By way of non-limiting illustration, a physical object may include a device worn by users of a theme park, a cruise ship, a retail store, and/or other geographic locations.

In some implementations, an individual dock of one or more docks 126 may include a reader and/or other device configured to obtain signals from products and/or provide signals associated with individual products to one or more physical processors 104. A given signal may convey information including one or more one or more of product identification information, user identification information, usage information, and/or other information stored by the product. In some implementations, a reader may be a peripheral device configured to be communicatively coupled with vehicle 102 and/or one or more components of system 100. In some implementations, a reader may be integrated so as to form a singular device with a component of system 100 (e.g., integrated into a component of vehicle 102). A reader may include RFID components configured to communicate with RFID components (one or more radio frequency communication components) and/or other components.

In some implementations, user identification information may include information that identifies individual users. The user identification information may include one or more of a name, a username, a handle, subscription information, and/or other information. The product identification information may include information that identifies individual products. The communication of product identification information may further facilitate detection of presence of the product storing the product identification information. The product identification information may include one or more of a name, a serial number, and/or other information. A serial number may be unique to an individual product. That is, even if two different physical object depict the same entity (such that they appear as identical), the different products may have different and unique serial numbers to distinguish between them. The usage information may convey recent and/or anticipated use of individual products. In some implementations, recent and/or anticipated use of individual products may refer to use in one or more of the real world, a virtual world (e.g., a game), and/or other types of use.

Individual displays of one or more displays 122 may be configured to present visual content. Visual content may include content that may be observed visually. Visual content may include one or more of an image, a video, and/or other visual content. In some implementations, the visual content may include virtual content in the form of an interactive space. In some implementations, an individual display of one or more displays 122 may part of a wearable headset. A display may include one or more of a head-mounted display (HMD), an optical head-mounted display, a see-through display, an optical see-through display, a video see-through display, a visor, eyeglasses, sunglasses, a smartphone, a tablet, a mobile device, a projector, and/or other displays. In some implementations, an individual display of one or more displays 122 may include a set of displays that present visual content to each eye individually as stereo image pairs. In some implementations, one or more displays 122 may include other devices or components not worn by a user. For example, in an implementation, one or more displays 122 may include components integrated into vehicle 102. For example, a headrest may include a display, windows of a vehicle may include or may be replaced with transparent or opaque displays, and/or displays may be integrated in other ways.

In FIG. 1, one or more physical processors 104 may be configured to provide information processing capabilities in system 100. The one or more physical processors 104 may be configured by machine-readable instructions 106. The machine-readable instructions 106 may include one or more computer program components. Executing the one or more computer program components may cause one or more physical processors 104 to facilitate presenting in-vehicle content based on characterization of products. The computer program components may include one or more of a detection component 108, a user component 110, a characterization component 111, a content component 112, a control component 114, and/or other components.

The detection component 108 may be configured to obtain output signals conveying detection information, and/or other information. The output signals may be obtained from one or more of the one or more vehicle sensors 124, one or more docks 126, and/or other sources. The detection information may facilitate detection and/or identification of one or more products and/or one or more users of the products near and/or within an interior of the vehicle. In some implementations, "within" an interior of a vehicle may include being at or past a doorway threshold of the vehicle. In some implementations, "within" an interior of a vehicle may include being in a passenger seating area of the vehicle and/or other locations. In some implementations, "near" an interior of the vehicle may include at a door of the vehicle. In some implementations, "near" an interior of the vehicle may include a threshold distance from the vehicle. In some implementations, the threshold distance may be dictated by the arrangement and/or capabilities of one or more vehicle sensors 124 and/or one or more docks 126. By way of non-limiting illustration, the threshold distance may be dictated by a range of an RFID reader of a dock. In some implementations, the threshold distance may be dictated by an arrangement and/or position of an image sensor. By way of non-limiting illustration, an image sensor may be positioned to capture images of the real world within a field of view of the image sensor. If the image sensor is arranged so that the field of view includes areas both inside and outside the vehicle, the distance at which images may be clearly captured outside the vehicle may dictate the threshold distance.

The detection component 108 may be configured to detect, based on obtained output signals conveying detection information and/or other information, presence of one or more products and/or one or more users near and/or within the interior of the vehicle. Detection of presence may be facilitated by one or more techniques presented herein. For example, detection may be facilitated by one or more of an image-based technique, an audio-based technique, receiving output signals conveying product identification information, and/or other techniques.

By way of non-limiting illustration, detection component 108 may be configured to detect presence of a first product and/or first user of the first product near and/or within the interior of the vehicle.

The detection component 108 may be configured to identify one or more products and/or one or more users detected as being present near or within the interior of the vehicle. Identifying a product and/or user may include determining an identity of the product and/or user. Determining an identity of a product may include determining one or more of a name of the product, a unique identifier of the product, and/or other information. Determining an identity of a user may include determining one or more of a name of the user, a username of the user, an account name, an account number, and/or other information. Identification may be performed using one or more techniques presented herein and/or other techniques. For example, identification may be facilitated by one or more of an image-based technique, an audio-based technique, receiving output signals conveying product identification information, and/or other techniques.

The user component 110 may be configured to obtain user information for individual users. The user component 110 may be configured to obtain user information for individual users identified as being present near and/or within the interior of vehicle 102. The user information may include one or more of user identification information, product information, and/or other information.

In some implementations, the product information for the individual users may specify individual sets of products that the individual user interact with. This may include products owned by the users, products experienced by the users, and/or other products. Interactions may include one or more of playing, visiting, sharing, viewing, and/or other forms of interaction. In some implementations, the product information for the individual users may specify individual sets of products interacted with by the individual users prior to a ride in the vehicle 102. By way of non-limiting illustration, user component 110 may be configured to obtain first user information for a first user and/or other information for other users. The first user information may include one or more of first user identification information, first product information, and/or other information. The first product information may include information specifying a first set of products interacted with by the first user prior to the ride in the vehicle 102.

The characterization component 111 may be configured to determine characterization information for the individual users. The characterization information may characterize individual products included in the individual sets of products utilized by the individual users. The characterization may be based on one or more product attributes of the individual products. The characterization may include determining individual values of individual product attributes.

The one or more product attributes may include one or more of a product brand attribute, a time period of interaction attribute, a frequency of use attribute, a cost attribute, a gameplay attribute, and/or other attributes.

A value of a product brand attribute of a product may specify a brand of the product. Product brand may refer to a network of intellectual property with which the product may be associated with. By way of non-limiting illustration, brand may refer to one or more of a proprietary franchise, a type of product manufactured by a particular company under a particular name, and/or other information. A proprietary franchise may include one or more of a movie franchise, a game franchise, a marketing franchise, a clothing franchise, and/or other proprietary franchise.

A value of a time period of interaction attribute of a product may specify an amount of time a user has interacted with the product prior to the ride in the vehicle 102. An amount of time a user has interacted with a product may include one or more of an amount of gameplay (e.g., within a video game, with a physical object, etc.), an amount of time spent at a location (e.g., a theme park), and/or other information.

A value of a frequency of use attribute of a product may specify a quantity of user interaction with the product over a certain past period of time. The past period of time may include one or more of a week, a month, a year, and/or other periods of time.

A value of a cost attribute of a product may specify a cost associated with a product. The cost associated with the product may include a cost to purchase the product, a cost to rent the product, a cost to experience the product (e.g., an entrance fee to a theme part, a price of a movie ticket, etc.), and/or other information.

A value of a gameplay attribute may specify one or more of game achievement (e.g., leveling up, abilities acquired, virtual objects acquired, etc.), a score reach, a particular in-game task completed and/or attempted (e.g., tournaments, quests, missions, etc.), other players played with, and/or other information.

By way of non-limiting illustration, the characterization component 111 may be configured to characterize the individual products in the first set of products based on one or more attributes to obtain first characterization information. The individual products in the first set of products may be characterized based on a first attribute and/or other attributes.

In some implementations, the characterization component 111 may be configured to identify, for individual users, one or more subsets of products from the individual sets of products based on the characterization information. An individual subset of products may include one or more products having one or more values of one or more attributes in common. By way of non-limiting illustration, products having one or more values of one or more attributes in common may be grouped together into a subset of products. In some implementations, "in common" may refer to one or more of the same value, values within a threshold, and/or other considerations. By way of non-limiting illustration, for the cost attribute, products within a threshold range of price may be considered "in common" even though the cost may not be exactly the same. By way of non-limiting illustration, a first subset of products may be identified from the first set of products based on the first characterization information. The first subset of products may include one or more products within the first set of products having a first value of the first product attribute in common.

The content component 112 may be configured to identify in-vehicle content for presentation. The in-vehicle content for presentation may include content specific to individual subsets of products within the individual sets of products interacted with by individual users. In some implementations, the content component 112 may identify in-vehicle content for presentation that may be specific to an individual subset of products that includes one or more products detected (and identified) as being near and/or within the vehicle 102. In some implementations, the content component 112 may identify in-vehicle content for presentation that may be specific to an individual subset of products that includes relatively more products than other subsets of products. An individual subset of products that includes relatively more products than other subsets of products within a set of products interacted with by a user may indicate that the user has an affinity to products having the one or more values of one or more products attributes common within that individual subset that includes the relatively most products.

In some implementations, content may be specific to individual subsets of products by virtue of the content being representative of the one or more values of the one or more product attributes that are common within the individual subsets of products. In some implementations, the content may be representative of the one or more values of the one or more product attributes that are common based on the content including one or both of visual depictions of appearance(s) of the one or more values of the one or more product attributes that are common and/or audio characteristics of the one or more values of the one or more product attributes that are common. By way of non-limiting illustration, the first product attribute may comprise product brand. The first value of the first product attribute that is common within the first subset of products may include a particular brand. A first set of content that may be specific to first value of the first product attribute common within the first subset of products may include branded content of the particular brand.

In some implementations, the content component 112 may be configured to prioritize the provision of the identified in-vehicle content. In some implementations, the prioritization may be based on one or more other values of one or more other product attributes of the products included in the individual subsets of products. In some implementations, prioritization may be based on ranking products within the individual subsets of products based on the one or more other values of the one or more other product attributes of the products included in the individual subsets of products. Ranking may include ordering the values from highest to lowest. Content within an identified set of in-vehicle content associated with the products having the other values of the other product attributes ranked as being relatively may be presented before content within the identified set of in-vehicle content associated with product having the other values of the other products ranked as being relatively lower.

By way of non-limiting illustration, content within the first set of content may be prioritized based on values of a second product attribute of the products included in the first subset of products. For example, as mentioned above, the first set of content may include branded content of the particular brand. The second attribute may include the cost attribute and/or other attributes. The products within the first subset of products (again, which share a common brand and/or other value of a product attribute) may be ranked from most expensive to least expensive. Content within the first set of content associated with the relatively expensive products may be prioritized over content within the first of content associated with the relatively lease expensive products. As an illustrative example, the brand in common with first subset of products may include a movie franchise. The first set of content may include content associated with the movie franchise. The products within the first subset of products may include toys depicting different characters associated with the movie franchise. The most expensive toy may depict a particular character. Accordingly, content within the first set of content which is associated with the particular character of the movie franchise may be prioritized over other content in the first set of content that is associated with other characters.

As another illustrative example, the second attribute may include the gameplay attribute and/or other attributes. The products within the first subset of products (again, which share a common brand and/or other value of a product attribute) may be ranked based on most game achievements to least game achievements. Content within the first set of content associated with the relatively more game achievements may be prioritized over content within the first set of content associated with the relatively less game achievements. As an illustrative example, the brand in common with first subset of products may include a movie franchise. The first set of content may include content associated with the movie franchise. The products within the first subset of products may include toys depicting different characters associated with the movie franchise. The toys may also be usable (e.g., to instantiate a game character that has the same appearance as the toy) with a game console to play a game also branded based on the movie franchise. The toys may depict individual characters in the movie franchise. One or more of the toys may have been used with the game console to achieve more game achievements than other toys. Accordingly, content within the first set of content which is associated with the particular character of the movie franchise associated with a toy that has been used to obtain the most game achievements may be prioritized over other content.

In some implementations, content may include one or more of audio content, tactile content, visual content, and/or other content.

Audio content may include sound libraries that facilitate reproducing specific sounds. The sounds may include one or more of speech, sound effects, and/or other sounds.

Tactile content may include content and/or experiences that can be sensed physically. By way of non-limiting illustration, tactile content may include one or more of a perceivable change in temperature, a vibration, and/or other content. In some implementations, tactile content may be provided via a climate control system of a vehicle. In some implementations, if a subset of products have a value of a product attribute in common that is associated with a cold temperature (or hot temperature), a climate control system may be controlled to reduce (or increase) the temperature of air supplied by the climate control system.

In some implementations, visual content may include one or more of an animation, a movie, an interactive space, and/or other visual content. Visual content may be accompanied by audio content. An amination may include characteristics of a common value of an attribute shared by a subset of products, and/or other content. A movie may include characters that the products in a subset of products depict, environments that entities depicted by the products in a subset of products may be associated with, and/or other content. An interactive space may comprise a simulated space that may be more robust and/or interactive than an animation and/or movie. For example, an interactive space may include one or more games, one or more user-controllable elements, and/or other content.

In some implementations, visual content may include narrative content. Narrative content may generally follow a structure of a storytelling experience. The narrative content may include a story related to a subset of products and/or a common value of a product attribute associated with the subset of products.

In some implementations, content component 112 may be configured to implement an instance of an interactive space (e.g., virtual space) executed by the computer components to determine state of the interactive space. The state may then be communicated (e.g., via streaming visual data, object/position data, and/or other state information) from one or more physical processors 104 to one or more displays 122 for presentation to users. The state determined and presented may correspond to a location in the interactive space. The view described by the state may correspond, for example, to the location from which the view is taken, the location the view depicts, and/or other locations, a zoom ratio, a dimensionality of objects, a point-of-view, and/or parameters of the view. One or more of the view parameters may be selectable by the users.

An instance of the interactive space may comprise a simulated space. The simulated space may have a topography, express ongoing real-time interaction by one or more users, and/or include one or more virtual objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

In some implementations, the simulated space may be specific to one or more of a product, a subset of products, a common value of a product attribute associated with a subset of products, and/or other considerations. Accordingly, the simulated space may be fantastical space, a realistic space, and/or other types of content. By way of non-limiting illustration, a product may depict a movie character, and the simulated space may depict the environment that the character is depicted within that movie.

The above description of the manner in which the state of the interactive space is determined by content component 112 is not intended to be limiting. The content component 112 may be configured to express the interactive space in a more limited, or richer, manner. For example, views determined for the interactive space representing the state of the instance of the interactive space may be selected from a limited set of graphics depicting an event in a given place within the interactive space. The views may include additional content (e.g., text, audio, pre-stored video content, and/or other content) that describes particulars of the current state of the place, beyond the relatively generic graphics. Other expressions of individual places within the interactive space are contemplated.

Within the instance(s) of the interactive space executed by content component 112, users may control entities (e.g., game entities for gameplay), simulated physical phenomena (e.g., wind, rain, earthquakes, and/or other phenomena), and/or other elements within the interactive space to interact with the interactive space, other virtual objects, and/or other users. The game entities may include virtual characters such as avatars. The game entities may include virtual representations of the products. As used herein, the term game entity may refer to a virtual object present in the interactive space that represents an individual user. A game entity may be controlled by the user with which it is associated. The user-controlled element(s) may move through and interact with the interactive space (e.g., non-user characters in the interactive space and/or other objects in the interactive space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the interactive space.

Control by users may be exercised through control inputs and/or commands input by the users through one or more input techniques, such as a controller (not shown in FIG. 1), voice-based inputs, gesture-based inputs, and/or other inputs. The users may interact with each other through communications exchanged within the interactive space. Such communications may include one or more of textual chat, instant messages, private messages, voice communications, and/or other communications. Communications may be received and entered by the users. Communications may be routed to and from the appropriate users through one or more physical processors 104 and/or through communications which are external to the system 100 (e.g., text messaging services).

The instance of the interactive space may be persistent. That is, the interactive space may continue on whether or not individual user are currently logged in and/or participating in the interactive space. A user who logs out of the interactive space and then logs back in some time later may find the interactive space has been changed through the interactions of other users with the interactive space during the time the user was logged out. These changes may include changes to the simulated physical space, changes in the user's inventory, changes in other users' inventories, changes experienced by non-player characters, changes to the virtual items available for use in the interactive space, changes based on ongoing changes to usage information, and/or other changes.

Games within the interactive space may be configured to elicit certain behaviors and/or actions from a user. For example, games may include objectives and/or goals which a user may attempt to complete through interaction with the game.

In some implementations, content component 112 may be configured to obtain ride information and/or other information. The ride information may be obtained from output signals generated by one or more vehicle sensors 124 and/or other sources. The ride information may include one or more of motion information, activity information, trip progress information, environment information, caravanning information, and/or other ride information.

In some implementations, the content component 112 may be configured to adjust the content to be provided based on the ride information and/or other information. In some implementations, the adjustment(s) may be based on one or more of predicted events likely to occur based on the ride information, actual occurrence of the predicted events, and/or other conditions.

The content component 112 may be configured to predict events likely to occur based on the ride information and/or other information. Events likely to occur may include real-world events involving the vehicle and/or occurring at or near the vehicle. In some implementations, predicting events likely to occur may further include determining event type of the individual predicted events.

By way of non-limiting illustration, events may include one or more of a stopping event (e.g., the vehicle is coming to a stop or is stopped), an acceleration event (e.g., the vehicle accelerates), a turning event (e.g., the vehicle turns), a particular weather event (e.g., it is raining, sunny, cloudy, etc.), vertical movement event (e.g., hits a speed bump), a passing event (e.g., passing or being passed by one or more of an object, a building, another vehicle, etc.), and/or other events.

Event types may characterize events based on their expectancy of occurring. Event types may include one or more of expected-type events, unexpected-type events, and/or other event types. In general, expected-type events may allow for content adjustments to be pre-planned, while unexpected-type events may require content adjustment that are more reactive in nature.

Expected-type events may include events that may be predicted from ride information well in advance of any actual or predicted occurrence of the events. The term "well in advance" may refer to one or more of being at a beginning of a trip and/or a threshold time before a predicted occurrence (or actual occurrence) of the predicted event. A threshold time may be in the range of one or more of five to ten minutes, one to five minutes, ten to thirty seconds, one to five seconds, and/or other amount of time before a predicted (or actual) occurrence.

For example, an event of an expected-event type may be predicted to likely occur based on obtained motion information and/or other information. The motion information may convey a deceleration of vehicle. The event likely to occur may include a stop event, e.g., the vehicle may likely being coming to a stop based on the vehicle deceleration.

An event of an expected-event type may be predicted to likely occur based on obtained activity information and/or other information. The activity information may convey a movement of a vehicle operator's head in a first direction. The event likely to occur may include a turning event toward the first direction.

An event of an expected-event type may be predicted to likely occur based on obtained trip progress information and/or other information. The trip progress information may convey a particular location of the vehicle along a trip. The particular location may include, for example, a freeway onramp. The event likely to occur may include an acceleration event, e.g., the vehicle may likely start to accelerate to merge with freeway traffic.

An event of an expected-event type may be predicted to likely occur based on obtained environment information and/or other information. The environment information may convey a particular terrain is approaching on a road (e.g., a speed bump). The event likely to occur may include a vertical movement event, e.g., the vehicle may rise for a short period of time as it passes over the speed bump.

An event of an expected-event type may be predicted to likely occur based on obtained caravanning information and/or other information. The caravanning information may convey a relative position of an other vehicle approaching the position of the vehicle. The event likely to occur may include a passing event, e.g., the vehicle may likely be passing the other vehicle and/or may be passed by the other vehicle.

Unexpected-type events may include events that may be predicted from ride information within a short duration of any actual and/or predicted occurrence of the events. The term "short duration" may refer a threshold time before a predicted occurrence (or actual occurrence) of the predicted event. A threshold time may be in the range of one or more of five to ten seconds, three to five second, one to three second, one half to one second, 200 to 500 milliseconds, 100 to 200 milliseconds, ten to 100 milliseconds, one to ten milliseconds, and/or other amount of time before a predicted (or actual) occurrence.

For example, an event of an unexpected-event type may be predicted to likely occur based on obtained motion information, environment information, and/or other information. The environment information may convey a particular location of the vehicle being on a freeway. The motion information may convey a deceleration of vehicle. The event likely to occur may include a stopping event, e.g., the vehicle may likely be coming to a stop at a location (freeway) that is usually not known as a location for stopping and/or the stop may be in response to a sudden traffic event or obstacle.

An event of an unexpected-event type may be predicted to likely occur based on obtained activity information, and/or other information. The activity information may convey a sudden tightening of the operator's grip on the steering wheel. The event likely to occur may include a turning event and/or a stopping event, e.g., unexpected traffic and/or objects in the road may cause the operator to perform last-minute evasive maneuvers.

An event of an unexpected-event type may be predicted to likely occur based on obtained environment information and/or other information. The environment information may convey an object (such as a person) is approaching the vehicle. The event likely to occur may include a turning event and/or a stopping event, e.g., approaching object may cause the operator to perform last-minute evasive maneuvers to avoid hitting the object.

An event of an unexpected-event type may be predicted to likely occur based on obtained caravanning information and/or other information. The caravanning information may convey that a previously unknown vehicle is present and quickly approaching (appearing from around a blind corner, for example). The event likely to occur may include a passing event.

It is noted that the above descriptions of events, event types, and prediction of events are provided for illustrative purposes only and not to be considered limiting. For example, events may include one or more events within the scope of the disclosure but not explicitly listed herein. The events may be categorized into other types. The prediction of events may be carried out in other manners. For example, vehicles may include Advanced Driver Assistance Systems (ADAS) and/or others sensors allowing onboard processing to predict events in other ways.

The content component 112 may be configured to trigger adjustments to content (e.g., visual, audible, and/or haptic) at individual occurrences of individual predicted events. Triggering adjustments to visual content may include effectuating one or more of modifications, additions, and/or removal of content presented to the user. Adjustment may be directed to one or more of a particular virtual object and/or set of virtual objects, a topography of a simulated space, simulated physical phenomena, and/or other content.

Individual potential adjustments may be of individual adjustment types. The adjustment types may include expected-type adjustments, unexpected-type adjustments, and/or other adjustment types. Adjustment types of the adjustments may correspond to event types of the predicted events. In some implementations, an individual adjustment may correspond to an individual event regardless of event type.

By way of non-limiting illustration, adjustments of an expected-type may include modifications, additions, and/or removal of content that may be triggered based on expected-type events being predicted. Adjustments of an unexpected-type may include modifications, additions, and/or removal of content that may be triggered based on unexpected-type events being predicted. In some implementations, adjustments of the expected-type may be incorporated or integrated into a narrative of story content as expectancy of occurrence of expected-type events may allow these adjustments to be preplanned. For example, if a trip includes a known stop sign location, the stopping event at that stop sign can be predicted well in advance of the event occurring. Accordingly, an adjustment to a story can be provided at the occurrence of that stopping event, and the adjustment may be an integral part of the narrative of the storyline (e.g., a climax, a plot twist, a character introduction, etc.). In some implementations, adjustments of the unexpected-type may be incidental or "one-off" adjustments as the expectancy of occurrence of unexpected-type events may not be preplanned well in advance. For example, adjustments of the unexpected-type may be reactive in nature and may or may integrate into a narrative.

In some implementations, individual aspects of virtual content in an interactive space may be associated with individual sets of potential adjustments. Aspects of the virtual content may refer to individual virtual objects, scenes (e.g., including certain arrangements of virtual objects, parts of a storyline, and/or other considerations), a certain point in time along the progress of a game, and/or other aspects. Depending on a state of the interactive space (e.g., what aspects are currently present) at the time of a predicted event, an individual adjustment may be selected from a set of potential adjustments. The selection may be based on the specific predicted event, the event type of the predicted event, and/or other information. For example, a first virtual object may be associated with a first set of potential adjustments. The first set of potential adjustments may include one or more of a first adjustment, a second adjustment, third adjustment, and/or other adjustments. The first adjustment may be of an unexpected type and may be selected if an event of an unexpected type is predicted while the first virtual object is present in a view of the interactive space. The second adjustment may be of an expected type and may be selected if an event of an expected type is predicted while the first virtual object is present in a view of the interactive space. The third adjustment be selected if a specific event is predicted while the first virtual object is present in a view of the interactive space, regardless of event type.

The content component 112 may be configured to queue sets of potential adjustments and/or select one or more of the potential adjustments to trigger based on the predicted events and/or event types of the predicted events. The content component 112 may be configured to trigger the individual adjustments at individual occurrences of the individual predicted events.

In some implementations, individual occurrences of individual predicted events may include one or more of predicted occurrences of the predicted events and/or actual occurrences of the predicted events. Accordingly, content component 112 may be configured to determine, based on the ride information, the actual occurrences of the predicted events. By way of non-limiting illustration, ride information conveying a deceleration of a vehicle may predict an occurrence of a stopping event, while ride information conveying the vehicle is no longer in motion may indicate an actual occurrence of the stopping event.

Triggering adjustments at individual occurrences of individual predicted events may include triggering prior to the occurrences (actual or predicted), at a start of the occurrences (actual or predicted), and/or at a time following the occurrences (actual or predicted).

By way of non-limiting illustration, a trip may start and content may be identified and presented to a user. The content may correspond to, for example, a narrative-type experience and may include a story. At a subsequent point in time, a first event may be predicted. A set of potential adjustments may be queued for selection and triggering. The set of adjustments may include one or more of a first potential adjustment, a second potential adjustment, a third potential adjustment, and/or other potential adjustments. At least one of the potential adjustments may be selected based on one or more of the first event, the event type of the first event, and/or other information. For example, the third potential adjustment may be selected and triggered based on one or more of the first event, the event type of the first event, and/or other information. The trip may resume. At a subsequent point in time, a second event may be predicted. A set of potential adjustments may be queued for selection and triggering. The set of adjustments may include a fourth potential adjustment and/or other potential adjustments. The fourth potential adjustment may correspond to the second event. The fourth potential adjustment may be selected and triggered 318 based on the second event and/or other information. The trip may resume. It is noted that the above descriptions are for illustrative purposes only and are not to be considered limiting. For example, content adjustments may be expressed in other ways.

The control component 114 may be configured to control individual vehicle components of the one or more vehicle components of vehicle 102 to provide in-vehicle content. By way of non-limiting illustration, control component 114 may be configured to control a first vehicle component to provide the first set of content and/or other content.

In some implementations, control component 114 may be configured to, responsive to determining in-vehicle content to provide, determine which vehicle components of the one or more vehicle components are available to provide the content. For example, some content may be presentable via one or more specific vehicle components. Some vehicles may not include one or more of the vehicle components needed to present content. Accordingly, the control component 114 may be configured to determine which vehicle components are available, and then control the available vehicle components to provide content suitable for those type of available vehicle components. By way of non-limiting illustration, an animation may include visual content and audio content. The visual content may be presented via a display and the audio content may be presented via an audio output device. If a vehicle does not have a display but does have an audio output device, control component 114 may be configured to determine that the audio output device is available and the display is unavailable. The control component 114 may be configured to control the audio output device to provide the audio content of the animation, without presentation of visual content via a (nonexistent) display.

In some implementations, responsive to determining (e.g., via detection component 108) that one or more products and/or users detected as being present near and/or within the interior of the vehicle are no longer near and/or within the interior of the vehicle, the control component 114 may be configured control the one or more vehicle components coupled to the vehicle to cease provision of in-vehicle content. By way of non-limiting illustration, responsive to determining that the first user is no longer present near and/or within the interior of the vehicle, control component 114 may be configured to cease provision of the first set of content by the first vehicle component.

Figure 3:
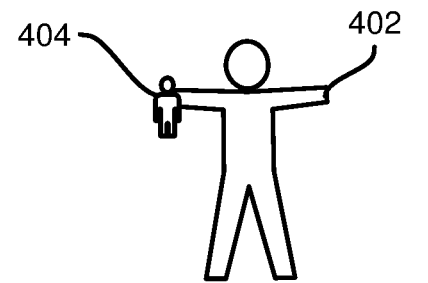
FIG. 3 shows a graphic of a user near and/or within an interior of a vehicle prior to presenting in-vehicle content based on characterization of products.
Figure 3:
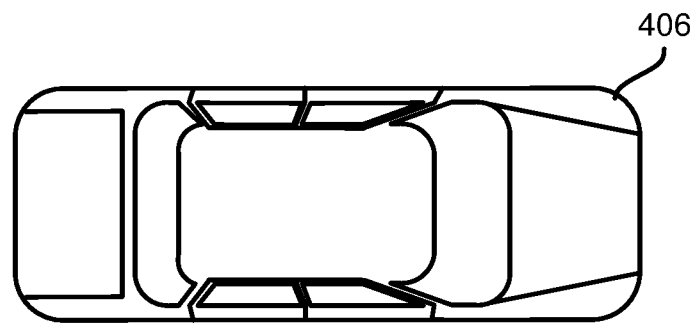

FIG. 3 shows a graphic of a user 402 bringing a product 404 near an interior of a vehicle 406. The product 404 may including a physical object physically embodying an appearance of a virtual entity, such as a game entity, movie entity, and/or other entities. The user 402 may bring the product 404 within a threshold distance of vehicle 406 and/or may bring product 404 within an interior of vehicle 406 (FIG. 4).

Figure 4:
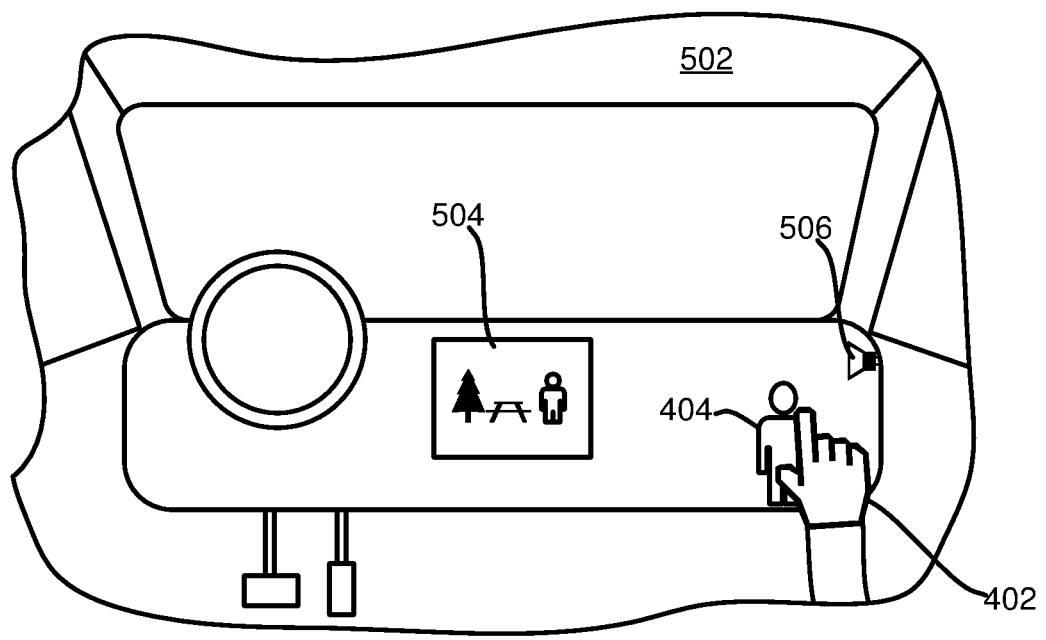
FIG. 4 shows a graphic illustrating presentation of in-vehicle content based on characterization of products.

FIG. 4 shows a graphic illustrating presentation of in-vehicle content based on detection of product 404 near (FIG. 3) and/or within (FIG. 4) an interior 502 of a vehicle (e.g., vehicle 406 in FIG. 3). The vehicle may include one or more vehicle components configured to present content. The one or more vehicle components may include one or more of a display 504, an audio output device 506, and/or other vehicle components. The display 504 may form part of one or both of an entertainment system and/or a navigation system. The audio output device 506 may form part of one or both of an entertainment system and/or a navigation system.

In some implementations, in-vehicle content may include visual content presented via display 504. The visual content may be specific to an individual subset of products interacted with by the user 402 including products having one or more values of one or more product attributes in common. By way of non-limiting illustration, in some implementations, the visual content may be specific to an individual subset of products including the product 404. By way of non-limiting illustration, the individual subset of products including the product 404 may be associated with a common brand. The visual content presented via display 504 may be branded content.

In some implementations, in-vehicle content may include audio content presented via audio output device 506. The audio content may be specific to the individual subset of products interacted with by the user 402 including products having the one or more values of one or more product attributes in common. By way of non-limiting illustration, in some implementations, the audio content may be specific to an individual subset of products including the product 404.

Returning to FIG. 1, although one or more physical processors 104, one or more vehicle sensors 124, one or more dock 126, one or more products 128, one or more displays 122, one or more audio output devices 120, and/or external resource(s) 130 are shown to be connected to network(s) 118 in FIG. 1, other communication medium may be used to facilitate interaction between any components of system 100. One or more components of system 100 may communicate through hard-wired communication, wireless communication, or both. For example, one or more physical processors 104 may wirelessly communicate with one or more vehicle sensors 124 and/or one or more docks 126. Wireless communication may include one or more of radio communication, Bluetooth communication, Wi-Fi communication, cellular communication, infrared communication, or other wireless communication.

Although one or more physical processors 104 is/are shown in FIG. 1 as a single entity, this is for illustrative purposes only. In some implementations, one or more physical processors 104 may comprise a plurality of processing units. These processing units may be physically located within the same device, or one or more physical processors 104 may represent processing functionality of a plurality of devices operating in coordination.

One or more physical processors 104 may be configured to execute one or more of components 108, 110, 111, 112, 114, and/or other components by software; hardware; firmware; some combination of software, hardware, and/or firmware; and/or other mechanisms for configuring processing capabilities on one or more physical processors 104. Although components 108, 110, 111, 112, and/or 114 are illustrated in FIG. 1 as being co-located within a single processing unit, in implementations in which one or more physical processors 104 comprises multiple processing units, one or more of 108, 110, 111, 112, and/or 114 may be located remotely from the other computer program components. The description of the functionality provided by the different computer program components 108, 110, 111, 112, and/or 114 is for illustrative purposes, and is not intended to be limiting, as any of computer program components 108, 110, 111, 112, and/or 114 may provide more or less functionality than is described. For example, one or more of computer program components 108, 110, 111, 112, and/or 114 may be eliminated, and some or all of its functionality may be provided by other computer program components 108, 110, 111, 112, and/or 114. As another example, one or more physical processors 104 may be configured to execute one or more additional computer program components that may perform some or all of the functionality attributed to one or more of computer program components 108, 110, 111, 112, and/or 114.

The electronic storage 117 of one or more physical processors 104 may include electronic storage media that electronically stores information. The electronic storage 117 may store software algorithms, information determined by one or more physical processors 104, information received from other components of system 100, and/or other information that enables system 100 to function properly.

The electronic storage media of electronic storage 117 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 117 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 117 may be a separate component within system 100, or electronic storage 117 may be provided integrally with one or more other components of system 100 (e.g., one or more physical processors 104). Although electronic storage 117 is shown in FIG. 1 as a single entity, this is for illustrative purposes only. In some implementations, electronic storage 117 may comprise a plurality of storage units. These storage units may be physically located within the same device, or electronic storage 117 may represent storage functionality of a plurality of devices operating in coordination.

The external resource(s) 130 may include sources of information, hosts (e.g., a host server that serves content), external entities participating with system 100, providers of content, and/or other resources. In some implementations, some or all of the functionality attributed herein to external resource(s) 130 may be provided by resources included in system 100.

Figure 2:
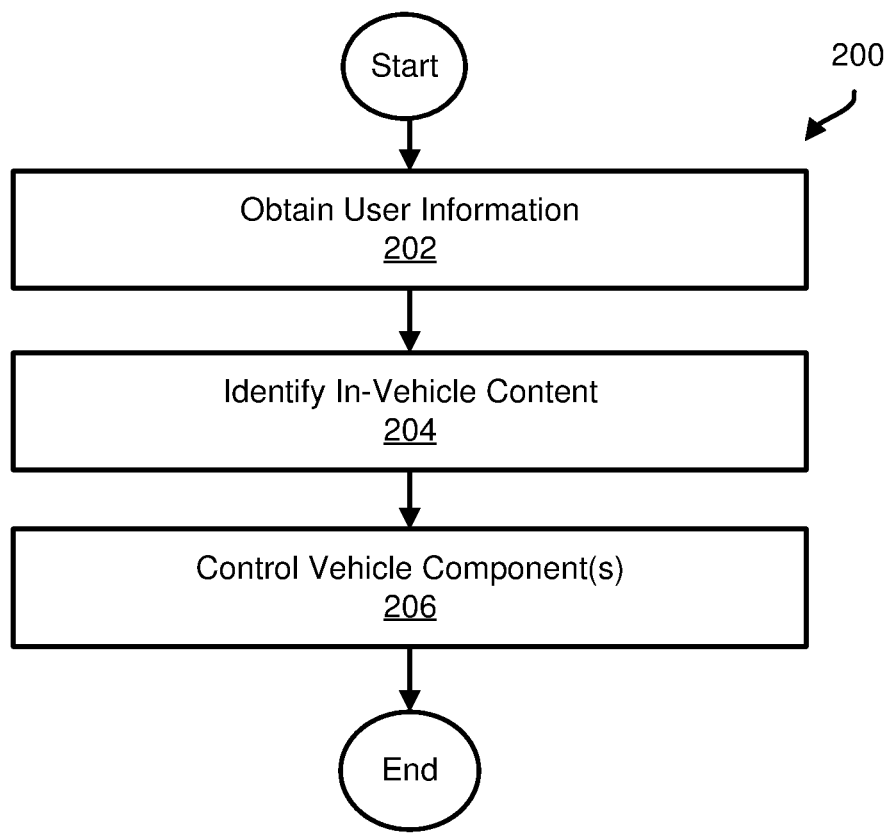
FIG. 2 illustrates a method to present in-vehicle content based on characterization of products, in accordance with one or more implementations.

FIG. 2 illustrates method 200 to present in-vehicle content based on characterization of products, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a computer system comprising one or more processing devices (e.g., a hardware processor, a digital processor, an analog processor, a digital circuit designed to process information, a central processing unit, a graphics processing unit, a microcontroller, an analog circuit designed to process information, a state machine, and/or other mechanisms for electronically processing information) and/or other devices. The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200. The one or more processing devices may be the same as or similar to one or more physical processors 104 in FIG. 1.

Referring to FIG. 2 and method 200, at operation 202, obtain user information for individual users may be obtained. The user information for the individual users may specify individual sets of products interacted with by the individual users prior to a ride in a vehicle. By way of non-limiting illustration, first user information for a first user may be obtained. The first user information may specify a first set of products interacted with by the first user prior to the ride in the vehicle. In some implementations, operation 202 may be performed by one or more physical processors executing a processor component the same as or similar to user component 110 (shown in FIG. 1 and described herein).

At operation 204, in-vehicle content specific to individual subsets of products within the individual sets of products may be identified. An individual subset of products may include products having one or more values of one or more product attributes in common. By way of non-limiting illustration, a first set of content specific to a first subset of products included in the first set of products may be identified. The first subset of products may include one or more products having a first value of a first product attribute in common. In some implementations, operation 204 may be performed by one or more physical processors executing a processor component the same as or similar to content component 112 (shown in FIG. 1 and described herein).

At operation 206, one or more vehicle components coupled to the vehicle may be controlled to provide the in-vehicle content specific to the individual subsets of products. By way of non-limiting illustration, a first vehicle component may be controlled to provide the first set of content. In some implementations, operation 206 may be performed by one or more physical processors executing a processor component the same as or similar to control component 112 (shown in FIG. 1 and described herein).

Although the system(s) and/or method(s) of this disclosure have been described in detail for the purpose of illustration based on what is currently considered to be the most practical and preferred implementations, such detail is solely for that purpose and that the disclosure is not limited to the disclosed implementations, but, on the contrary, is intended to cover modifications and equivalent arrangements that are within the spirit and scope of the appended claims. The present disclosure contemplates that, to the extent possible, one or more features of any implementation can be combined with one or more features of any other implementation.

What is claimed is:

1. A system configured to present in-vehicle entertainment experiences based on characterization of products, the system comprising:
a vehicle;
one or more docks connected to the vehicle, the one or more docks being configured to interface with electronics embedded within a product; and
one or more physical processors carried by the vehicle, the one or more physical processors being configured by machine readable instructions to:
obtain output signals generated by the one or more docks;
detect, based on the output signals, presence of the product having the electronics embedded therein near or within an interior of the vehicle;
based on detecting the presence of the product having the electronics embedded therein, identify a user associated with the product having the electronics embedded therein;
in response to identifying the user, obtain product information for the user identifying a set of products the user owns or has interacted with prior to a ride in the vehicle;
identify groups of products included in the set of products the user owns or has interacted with prior to the ride in the vehicle, wherein the set of products includes a first group of products having a first value of a product attribute in common and a second group of products having a second value of the product attribute in common;
determine the first group of products includes a first quantity of products and the second group of products includes a second quantity of products;
determine which of the first quantity of products or the second quantity of products is greater;
identify, in response to the first quantity of products being greater than the second quantity of products, a set of in-vehicle entertainment experiences specific to the first group of products; and
control one or both of a climate control system or a lighting system coupled to the vehicle to provide an in-vehicle entertainment experience in the set of in-vehicle entertainment experiences specific to the first group of products.

2. The system of claim 1, wherein the one or more physical processors are further configured by the machine-readable instructions to:
prioritize provision of in-vehicle entertainment experiences within the set of in-vehicle entertainment experiences based on values of a second product attribute of products included in the first group of products; and
control the climate control system or the lighting system to provide the in-vehicle entertainment experiences based on prioritization.

3. The system of claim 1, wherein the product attribute is product brand.

4. The system of claim 1, wherein the product attribute is time period of interaction.

5. The system of claim 1, wherein the product attribute is frequency of use.

6. The system of claim 1, wherein the product attribute is cost.

7. The system of claim 1, wherein an individual product in the set of products includes an individual good a or an individual service.

8. The system of claim 7, wherein the individual good includes one or more of a toy, a game console, a book, or an article of clothing, and the individual service includes one or more of a video game, an attraction at a theme park, or a movie watching experience.

9. The system of claim 1, wherein the set of in-vehicle entertainment experiences is specific to the first group of products by virtue of the set of in-vehicle entertainment experiences being representative of the first value of the product attribute.

10. A method to present in-vehicle entertainment experiences based on characterization of products, the method being implemented by one or more physical processors carried by a vehicle, the one or more physical processors being configured by machine-readable instructions, the method comprising:
obtaining, by the one or more physical processors, output signals generated by one or more docks connected to the vehicle, the one or more docks being configured to interface with electronics embedded within a product;
detecting, by the one or more physical processors based on the output signals, presence of the product having the electronics embedded therein near or within an interior of the vehicle;
based on the detecting the presence of the product having the electronics embedded therein, identifying, by the one or more physical processors, a user associated with the product having the electronics embedded therein;
in response to identifying the user, obtaining, by the one or more physical processors, product information for the user identifying a set of products the owns or has interacted with prior to a ride in the vehicle;
identifying, by the one or more physical processors, groups of products included in the set of products the user owns or has interacted with prior to the ride in the vehicle, including identifying, from the set of products, a first group of products having a first value of a product attribute in common and a second group of products having a second value of the product attribute in common;
determining, by the one or more physical processors, the first group of products includes a first quantity of products and the second group of products includes a second quantity of products;
determining, by the one or more physical processors which of the first quantity of products or the second quantity of products is greater;
identifying, by the one or more physical processors, and in response to the first quantity of products being greater than the second quantity of products, a set of in-vehicle entertainment experiences specific to the first group of products; and
controlling, by the one or more physical processors, one or both of a climate control system or a lighting system coupled to the vehicle to provide an in-vehicle entertainment experience in the set of in-vehicle entertainment experiences specific to the first group of products.

11. The method of claim 10, further comprising:
prioritizing provision of in-vehicle entertainment experiences within the set of in-vehicle entertainment experiences based on values of a second product attribute of products included in the first group of products; and
controlling the climate control system or the lighting system to provide the in-vehicle entertainment experiences content based on prioritization.

12. The method of claim 10, wherein the product attribute is product brand.

13. The method of claim 10, wherein the product attribute is time period of interaction.

14. The method of claim 10, wherein the product attribute is frequency of use.

15. The method of claim 10, wherein the product attribute is cost.

16. The method of claim 10, wherein an individual product in the set of products includes an individual good or an individual service.

17. The method of claim 16, wherein the individual good includes one or more of a toy, a game console, a book, or an article of clothing, and the individual service includes one or more of a video game, an attraction at a theme park, or a movie watching experience.

18. The method of claim 10, wherein the set of in-vehicle entertainment experiences is specific to the first group of products by virtue of the set of in-vehicle entertainment experiences being representative of the first value of the product attribute.

19. The system of claim 1, wherein the electronics embedded within the product include a radio-frequency identification (RFID) chip.

20. The method of claim 10, wherein the electronics embedded within the product include a radio-frequency identification (RFID) chip.

* * * * *